US 6,975,600 B1

(12) United States Patent
Vaughan et al.

(10) Patent No.: US 6,975,600 B1
(45) Date of Patent: Dec. 13, 2005

(54) MULTIMODE TRANSMISSION SYSTEM USING TDMA

(75) Inventors: Robert E. Vaughan, Redondo Beach, CA (US); Harold Rosen, Santa Monica, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 761 days.

(21) Appl. No.: 09/664,082

(22) Filed: Sep. 18, 2000

(51) Int. Cl.[7] .............................................. H04L 12/50
(52) U.S. Cl. ....................... 370/321; 370/323; 370/325
(58) Field of Search ................................ 370/310, 315, 370/316, 321, 323, 325, 319, 320, 324, 326, 375, 503, 512–515; 455/427, 12.1, 13.3, 428; 342/351, 352, 353; 375/354, 355

(56) References Cited

U.S. PATENT DOCUMENTS

| | | | | |
|---|---|---|---|---|
| 4,188,578 A | * | 2/1980 | Reudink et al. | 370/323 |
| 4,315,262 A | * | 2/1982 | Acampora et al. | 342/352 |
| 4,730,310 A | * | 3/1988 | Acampora et al. | 370/334 |
| 4,819,227 A | * | 4/1989 | Rosen | 370/325 |
| 4,931,802 A | * | 6/1990 | Assal et al. | 342/356 |
| 5,553,069 A | * | 9/1996 | Ueno et al. | 370/315 |
| 5,555,257 A | * | 9/1996 | Dent | 370/319 |
| 5,576,721 A | * | 11/1996 | Hwang et al. | 343/753 |
| 5,736,959 A | * | 4/1998 | Patterson et al. | 342/354 |
| 6,125,261 A | * | 9/2000 | Anselmo et al. | 455/12.1 |

OTHER PUBLICATIONS

Cooper et al, Intelligent Antennas: Spatial Division Multiple Access, Annual Review of Communication, pp. 999–1002, 1996.*

* cited by examiner

Primary Examiner—Frank Duong
(74) Attorney, Agent, or Firm—Georgann S. Grunebach

(57) ABSTRACT

A multimode transmission system using TDMA provides a plurality of satellite services to a ground station terminal. These services include timing beacon synchronization, multi-cast/broadcast data service, calibration data, and point-to-point data service. The multimode transmission system uses a TDM switch to generate a TDMA signal having a plurality of TDMA transmission frames. Each TDMA transmission frame includes a plurality of downlink frame time slots. Each time slot may be of variable length and is dynamically allocated to an individual satellite service based upon demand. The TDMA signal is then broadcast using an advanced transmit antenna system, which requires beam-shaping and beam power control features, to enable TDMA switching between shaped beams and spot beam modes of the antenna. These antenna features allow for the dynamic partitioning of satellite system capacity between wide-area broadcasts and localized point-to-point service and efficient utilization of the satellite transmission power.

15 Claims, 2 Drawing Sheets

MULTIMODE TRANSMISSION SYSTEM USING TDMA

TECHNICAL FIELD

The present invention relates generally to satellite communication systems, and more particularly to a multimode transmission system using time division multiple access (TDMA).

BACKGROUND ART

Satellites and other spacecraft are in widespread use for various purposes including scientific research and communications. These scientific and communications missions, however, cannot be accurately fulfilled without uploading and downloading electronic data. In many applications, the satellite relies upon uploading and downloading electronic data for position correction or system diagnostics. In other applications, the satellite acts as a relay to transfer data between two remote points on the Earth. Without the capability to receive and transmit electronic data, proper satellite function is hindered and at times impossible.

Many modern spacecraft act as relays to transfer data between two or more points on the Earth. There are several types of electronic data that these satellites broadcast. These include timing beacon synchronization data, multi-cast/broadcast data service, calibration data, and point-to-point data service. Unfortunately, typical satellites require multiple antennas and the associated electronics (modulators with frequency division multiplexing plans) required for each antenna for each of the above functions. The partitioning of satellite resources (capacity, power) across the services is either fixed of selectable in fixed quanta, and the services themselves often realized through parallel chains of RF and antenna equipment on the satellite. Furthermore, the terminals in these systems require multiple parallel receivers to participate in different transmission services.

For example, a satellite beacon signal is required by a terminal to synchronize time for a TDMA satellite communications system. The beacon signal typically has its own waveform and is generated independent of data transmissions. To conserve satellite power, the beacon is allocated relatively low EIRP. To conserve spectrum, the beacon occupies a small fraction of the downlink bandwidth. To minimize interference with the main data transmission, the beacon is usually located at the edge of the allocated band.

In addition to the added complexity in the generation and recovery of the beacon signal, the conventional approach has a number of inherent problems. First, there is a concern with possible interference from the main data transmission. Second, a small bandwidth can limit the timing accuracy of the beacon. Finally, the timing biases between the data transmission and the beacon signal due to different hardware paths typically need to be calibrated and eliminated.

The disadvantages associated with these conventional satellite transmission techniques have made it apparent that a new technique for satellite multimode transmission using time division multiple access is needed. The new technique should reduce the number of antennas and modulators required in the satellite while improving transmission performance. Additionally, the new technique should reduce the number of antennas and demodulators required in the terminal and allow a single terminal, with a single antenna, to receive all types of satellite service. The present invention is directed to these ends.

SUMMARY OF THE INVENTION

It is, therefore, an object of the invention to provide an improved and reliable multimode transmission system using TDMA. Another object of the invention is to reduce the number of antennas and modulators required in a satellite. An additional object of the invention is to improve satellite transmission performance.

In accordance with the objects of this invention, a multimode transmission system using TDMA is provided. In one embodiment of the invention, A multimode transmission system using TDMA provides a plurality of satellite services to a ground station terminal. These services include timing beacon synchronization, multi-cast/broadcast data service, calibration data, and point-to-point data service. The multimode transmission system uses a TDM switch to generate a TDMA signal having a plurality of TDMA transmission frames. Each TDMA transmission frame includes a plurality of downlink frame time slots. Each time slot may be of variable length and is dynamically allocated to an individual satellite service based upon demand. The TDMA signal is then broadcast using an advanced transmit antenna system, which requires beam-shaping and beam power control features, to enable TDMA switching between shaped beams and spot beam modes of the antenna. These antenna features allow for the dynamic partitioning of satellite system capacity between wide-area broadcasts and localized point-to-point service and efficient utilization of the satellite transmission power.

The present invention thus achieves an improved multimode transmission system using TDMA. The present invention is advantageous in that it reduces the number of antennas and demodulators required in the terminal and allows a single terminal, with a single antenna, to receive all types of satellite service.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
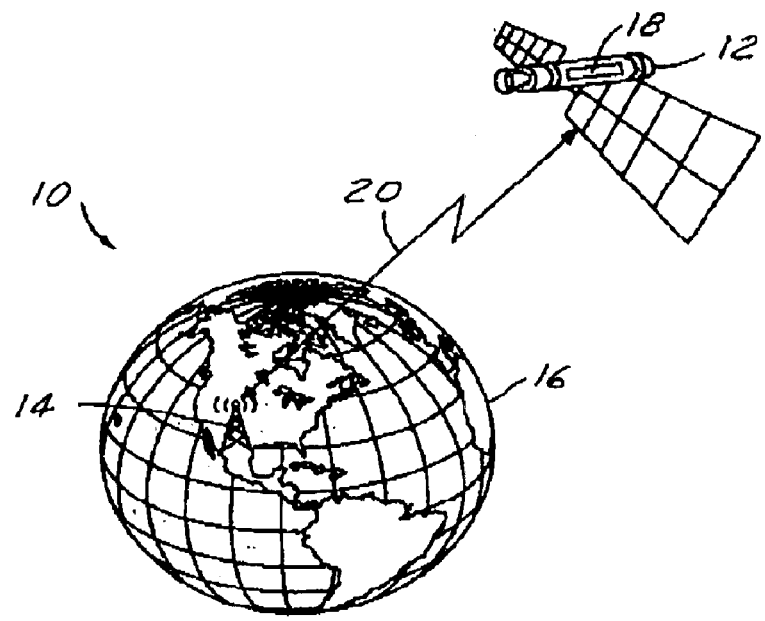
FIG. 1 is a satellite system in accordance with one embodiment of the present invention.

In the following figures, the same reference numerals will be used to identify identical components in the various views. The present invention is illustrated with respect to a multimode transmission system using TDMA, particularly suited for the aerospace field. However, the present invention is applicable to various other uses that may require multimode transmission system using TDMA.

Referring to FIG. 1, a perspective view of a satellite system 10 in accordance with one embodiment of the present invention is illustrated. The satellite system 10 is comprised of one or more satellites 12 in communication with a ground station 14 located on the Earth 16. Each satellite 12 contains one or more multimode transmission systems 18 using TDMA for allowing a terminal located in ground station 14 to receive multiple satellite services.

In a satellite system 10 employing TDMA for multiple access for uplink and downlink transmission 20, data is sent in bursts on the allocated slots in a frame structure. Both satellite 12 and ground station 14 terminal receivers have a dynamic but limited capability to acquire and demodulate the signal within a single burst in the presence of time and frequency errors.

In a satellite-based scheme, the satellite 12 is the time and frequency reference for communication. Even when a satellite 12 is in geosynchronous orbit with a very small inclination, there are, however, Doppler induced frequency offset and varying time delays that would put signals outside the required limit if they were not corrected.

Figure 2:
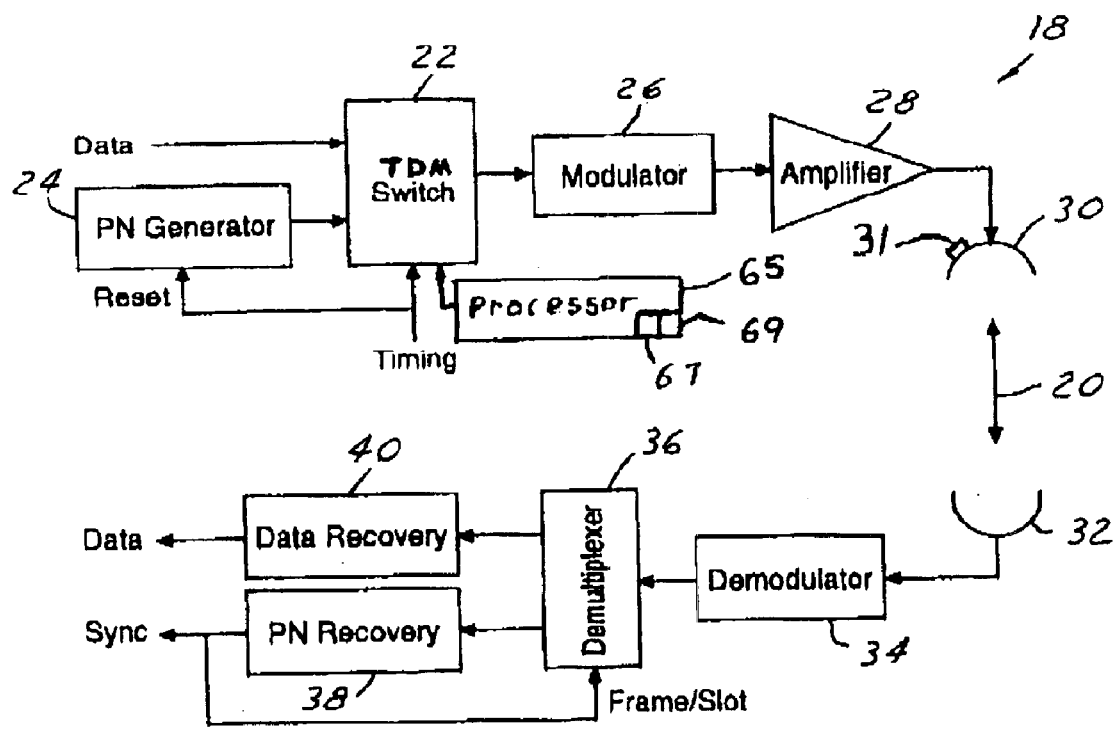
FIG. 2 is a block diagram of a multimode transmission system using TDMA in accordance with one embodiment of the present invention.

Referring to FIG. 2, a block diagram of a multimode transmission system 18 using TDMA in accordance with one embodiment of the present invention is illustrated. Multimode transmission system 18 includes a time division multiplexed (TDM) switch 22, a pseudo-random number (PN) generator 24, a modulator 26, and an amplifier 28. Both the data and the beacon (PN sequence generated by PN generator 24) are generated in baseband. The TDM switch 22 is used to insert the signals into the proper slots in the downlink frame. The resultant baseband data is used to modulate (using modulator 26) an appropriate RF carrier. After the final stage of power amplification, by amplifier 28, a satellite antenna 30 radiates the signal 20. Satellite antenna 30 is an advanced transmit antenna system, which requires beam-shaping and beam power control features or systems 31, to enable TDMA switching between shaped beams and spot beam modes of the antenna. These antenna features 31 allow for the dynamic partitioning of satellite 12 system's capacity between wide-area broadcasts and localized point-to-point service and efficient utilization of the satellites transmission power.

The composite signal 20 is received by the terminal antenna 32 and demodulated by a demodulator 34. The demodulated signal is then demultiplexed using de-multiplexer 36 and downlink timing is provided by the beacon receiver (PN recovery loop 38). After the beacon is acquired, clock, slot, and frame timing can be established and data slots can be processed using data recovery electronics 40.

Figure 3:
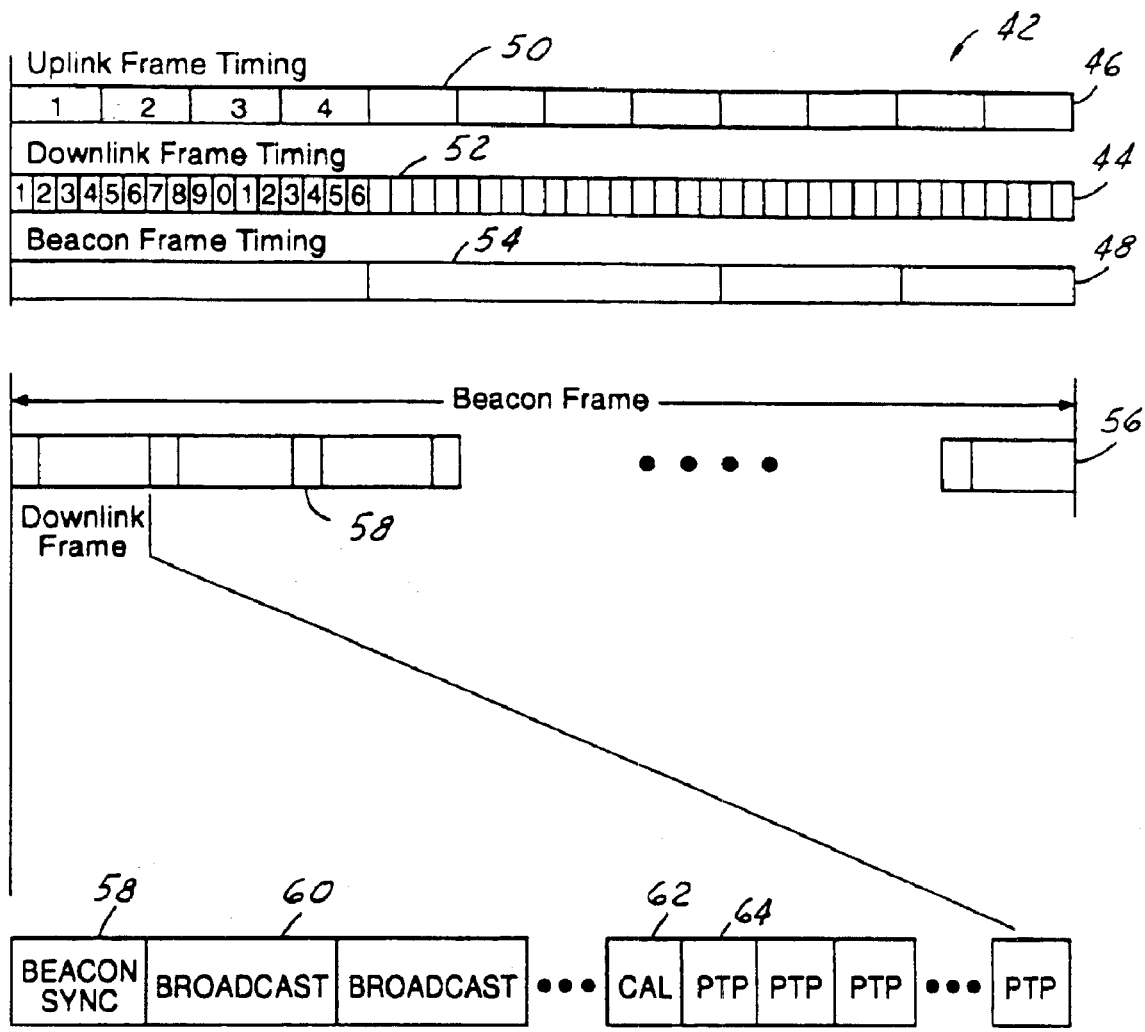
FIG. 3 is an aligned system TDMA framing structure and beacon frame in accordance with one embodiment of the present invention.

Referring to FIG. 3, an aligned system TDMA framing structure and beacon frame 42 in accordance with one embodiment of the present invention is illustrated. In the present invention, four downlink functions are illustrated (1) timing beacon synchronization (2) multicast/broadcast data service (3) calibration timeslot (4) point-to-point data service. One skilled in the art, however, would recognize that the present invention might be applied to various other satellite services. As such, the present system is implemented in a generalized fashion with programmable digital controllers such that the duty cycles (or timeslots) assigned to each service are variable.

Furthermore, the present invention utilizes a contiguous bandwidth allocated for space-to-earth transmissions. The PTP service in general is operated with a modulated carrier whose symbol rate, error correction code (ECC), and pulse shaping occupy the entire bandwidth B. Other service modes (timing beacon, broadcast, calibration, and/or cell-cast mode) utilize either the same modulation or a modulation with a reduced symbol rate to ensure link closure. Although not strictly required, the symbol rate reductions are conceived to be integer factors such as ½, ⅓, etc. to ensure timeslot alignment with an integer multiple of the full-rate timeslots (this facilitates system timing and control design). The ECC and pulse shaping filters may also be varied as required for optimum performance.

For timing beacon synchronization, the initial slot in the frame 42 is filled with a timing beacon synchronization pattern. During this timeslot 58, the antenna beam shape is set to a wide-area coverage broadcast shape. During the timing beacon slot 58, a reduced modulation symbol rate of ⅓ of the full rate modulation is used to ensure link performance over the wide-area beam. Note that for other narrower broadcast coverage regions (for example, with satellite operating over Europe, or Asia) the modulation symbol rate can be the full rate, or ½ rate, as required for link closure. Similarly, if a wider coverage is required a ¼ rate modulation would be used, etc.

Terminals attempting to logon to the system acquire the system timing by searching for the timing beacon slot PN code. Further information on downlink formatting (i.e. the length of the various sections of the downlink frame) is then available via system messages contained in either the broadcast 60 or PTP 64 section of the frame. A terminal may sort all successfully received messages for the address of the system information packet that contains the downlink format, at which point the terminal may restrict it's message processing to the PTP section 64 of the downlink frame.

The TDMA beacon signal provides frequency and timing references to allow a terminal to synchronize itself with the satellite 12. With the satellite 12 as the reference, a satellite downlink frame 44 and the satellite uplink frame 46 is aligned with the beacon frame 48 at the satellite 12. M uplink frames 50 and N downlink frames 52 fit into a beacon frame 54. The synchronization relationship between the beacon 54, uplink 52 and downlink 50 frame is shown in FIG. 1 for an example of M=4 and N=16. The TDMA beacon is inserted into a fixed slot of each downlink frame 44. As an example, the first slot of each downlink frame 44 is used for beacon frame 56.

A convenient means for time transfer is a pseudorandom (PN) sequence. Each of the beacon slots 58 contains a segment of a PN bit sequence that repeats on the beacon frame 56 as shown in FIG. 3. A fixed initial state of the PN generator identifies the beginning of the first beacon slot in the beacon frame 56. After the PN sequence fills the last slot in the beacon frame 56, the PN generator is re-initialized with the fixed state.

After the TDMA beacon is recovered at the terminal, the locally generated PN clock reference is used as a terminal frequency reference that is coherent with the satellite, after compensating for Doppler. This approach mitigates the need for a highly stable frequency reference for the terminal.

Time is transferred from the satellite 12 via identifying the PN epoch with a time of day (TOD) value from a satellite broadcast message. Using the TOD and satellite ephemeris contained in the message, Doppler can be determined and corrected. The spacecraft 12 maintains the system TOD on-board the spacecraft 12. The spacecraft 12 broadcasts the TOD information synchronized with the TDMA beacon.

For multi-cast/broadcast data service, each timeslot consists of N high-rate slots 60 (where N is an integer, for example N=3 for ⅓ rate modulation). During these broadcast timeslots 60, the antenna beam shape is set to a wide-area coverage broadcast shape. A reduced modulation symbol rate of ⅓ of the full rate modulation is used to ensure link performance over the wide-area beam. A single beam is radiated on each sense of circular polarization (LHCP and RHCP) so that interference is restricted to cross-polarized beam interference.

In a generalized multi-cast/broadcast data service, multiple shaped beams may be radiated. These multiple shaped beams would be narrower, the gains higher, the required RF power for all beams no greater than the total power available from the transmit antenna, and the co-polarized sidelobe performance of the beams would be compatible with link closure requirements for self-interference.

For calibration timeslot 62, a section of the DL frame 44 is dedicated for the calibration of the downlink transmit antenna 30. The specifics of the calibration method are not a subject of this particular application, but rather the general notion of embedding the calibration function into the TDMA downlink frame control. The manipulation of the antenna beam shape and individual antenna controls (beamforming amplitude/phase shifters, beam pointing or beam power control) occurs during this calibration timeslot 62 in coordination with ground measurement equipment.

For point-to-point data service, a section of the DL frame 44 is dedicated for the radiation of multiple narrow spot beams. A set of spot beams is radiated, on both polarizations (LHCP and RHCP). The spot beams are pointed to cover smaller downlink hexagonal cells. The pointing of the multiple beams is dynamically scheduled from the data queues in the satellite 12 on-board processor 65 utilizing an interference-check mechanism 67 that ensures sufficient distance between simultaneous downlink beams. A power check mechanism 69 also ensures that the required power for the sum of the total spot beam is less than or equal to the total available RF power in the transmit antenna.

Within this portion of the downlink, the "cell-cast" function is also implemented. A system uplink cell for the example system in this application is a group of 7 smaller hexagonal downlink cells. Cell-cast is performed by dedicating a unique network packet address which corresponds to the central downlink cell within the group of 7 cells. The RF transmit power associated with this network address is raised by 3 to 4 dB to ensure link performance is met at the edge of the uplink cell (i.e. the group of 7 downlink cells). Normally, cell-cast transmissions are queued with other PTP data packet transmissions and scheduled for transmission in an identical fashion, which minimizes the impact of the cell-cast messages on data throughput. When an increase of 4 dB in the RF transmission power would violate the power flux density (PFD) limit imposed by FCC regulations, the cell-cast messages may be converted to 7-way multi-cast and the message sent 7 times once to each downlink cell.

There are also hybrid approaches wherein the 4 dB increased power cell-cast is used for some of the cells, and for the remaining cells (less than 7) a few multicasts are sent. Since the fraction of the footprint experiencing the heavy rain conditions is small, the amount of cell-cast traffic required to be 7-way replicated is small. One skilled in the art would realize that the specifics of the current example (e.g. 7 downlink cells per uplink cell) can be generalized to other structures (square cells, 19 hex'cells per uplink cell, etc.).

The partitioning of system capacity across the various service types (i.e., broadcast and PTP, with embedded functions of timing beacon and downlink antenna/RE calibration) is variable and will be commanded by the network operations and control center (NOCC). The timing beacon function is a fixed allocation, which defines the frame boundary by its location in time. The adjustment of broadcast and PTP capacity can be performed using current demand statistics combined with pre-scheduled hourly/daily data transfers, and/or historical demand profiles. The calibration timeslot 62, occurring as shown between broadcast 60 and PTP 64 sections, may be present or not depending upon whether calibration is required. The overhead of any of these functions is small given the length of the DL data frame 44 is sufficiently long. Furthermore, one skilled in the art would realize that, the broadcast 60 and PTP 64 slots may be interspersed (interleaved, rather than contiguous).

The utilization of a downlink TDMA frame 44 also allows for the partitioning of system downlink capacity across the destination address space. One skilled in the art would realize that other possible utilizations of this functionality are possible. The capacity of the downlink may be arbitrarily divided across destination addresses, so that hard partitions of capacity can be allocated to arbitrary groups of downlink PTP cells. Furthermore, given a large, virtual address space, the capacity may be divided among service providers within the same sets of PTP cells by giving different timeslots to different service provider address groups. It should be noted that while this capability gives guaranteed capacity limits to each geographical region or to each virtual service provider, it reduces the statistical multiplexing performance, efficiency, and utilization of the total system capacity.

The method and system of the present invention provide for an improved multimode transmission system using TDMA. The present invention reduces the number of antennas and modulators required in a satellite while improving transmission performance. Additionally, the present invention reduces the number of antennas and demodulators required in a terminal and allows a single terminal, with a single antenna, to receive all types of satellite service.

From the foregoing, it can be seen that there has been brought to the art a new and improved multimode transmission system using TDMA. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A multimode transmission system using TDMA comprising:
   a TDM switch coupled to a data signal, said data signal comprising a plurality of satellite services, said TDM switch multiplexing said data signal into a TDMA signal comprising a plurality of TDMA transmission frames, each TDMA transmission frame having a plurality of downlink frame time slots, wherein each of said downlink frame time slots is dynamically allocated to one of said plurality of satellite services, which comprise a point-to-point service comprising a portion of said downlink frame time slots dedicated for radiating multiple spot beams, wherein said spot beams are pointed to cover downlink cells, said pointing dynamically scheduled from data queues:
   a modulator coupled to said TDM switch and receiving said TDMA signal, said modulator modulating said TDMA signal to generate a modulated TDMA signal;
   a transmit antenna comprising beam-shaping and power-controlling systems coupled to said modulator and broadcasting said modulated TDMA signal using at least one downlink beam, said at least one downlink beam having a shape and number determined by said data signal, said beam-shaping and power-controlling systems enabling TDMA switching between shaped beam modes and spot beam modes of said antenna; and a processor comprising said data queues, said processor further comprising a power check mechanism checking that required power for said multiple spot beams is less than or equal to a total available radio frequency power in said transmit antenna.

2. The multimode transmission system using TDMA as recited in claim 1, wherein one of said plurality of services comprises a timing beacon synchronization data signal.

3. The multimode transmission system using TDMA as recited in claim 1, wherein one of said plurality of services comprises a multi-cast/broadcast data service.

4. The multimode transmission system using TDMA as recited in claim 3, wherein said multi-cast/broadcast data service comprises a cell-cast function.

5. The multimode transmission system using TDMA as recited in claim 4, wherein messages from said cell-cast function are converted to multi-cast messages as a function of an RF transmission power increase above a regulated limit.

6. The multimode transmission system using TDMA as recited in claim 1, wherein one of said plurality of services comprises a calibration data signal.

7. The multimode transmission system using TDMA as recited in claim 1, wherein each of said plurality of downlink frame time slots is a variable length of time.

8. The multimode transmission system using TDMA as recited in claim 1, wherein each of said plurality of downlink frame time slots is a fixed length of time.

9. The multimode transmission system using TDMA as recited in claim 1, wherein said at least one downlink beam has a variable power assigned to ensure link availability and bit-error-rate performance for a coverage area of said at least one downlink beam.

10. The multimode transmission system using TDMA as recited in claim 9, wherein a transmission information rate of is altered to ensure link availability and bit-error-rate performance for a coverage area of said at least one downlink beam.

11. A method for satellite system synchronization comprising the steps of:

generating a data signal comprising a plurality of satellite services;

generating a timing signal;

multiplexing said data signal to generate a TDMA signal having a plurality of downlink frames each downlink frame having a plurality of downlink frame slots, wherein each of said plurality of downlink frame slots is dynamically allocated to one of said plurality of satellite services comprising a broadcast service and anoint-to-point service, wherein said multi-cast/broadcast data service comprises a cell-cast function;

converting messages from said cell-cast function to multi-cast messages as a function of an RF transmission power increase above a regulated limit;

modulating said TDMA signal to generate a modulated TDMA signal;

broadcasting said modulated TDMA signal using at least one downlink beam, said at least one downlink beam having a shape and number determined by said data signal; and TDMA switching between shaped beam modes and spot beam modes.

12. A satellite system comprising:

a ground station;

a satellite in orbit and in communication with said ground station, said satellite having a multimode transmission system using TDMA comprising:

a TDM switch coupled to a data signal, said data signal comprising a plurality of satellite services, said TDM switch multiplexing said data signal into a TDMA signal comprising a plurality of TDMA transmission frames, each TDMA transmission frame having a plurality of downlink frame time slots, wherein each of said downlink frame time slots is dynamically allocated to one of said plurality of satellite services, which comprise at least one of a broadcast service or a point-to-point service, said point-to-point service comprising a portion of said downlink frame time slots dedicated for radiating multiple spot beams, wherein said snot beams are pointed to cover downlink cells, said painting dynamically scheduled from data queues;

a modulator coupled to said TDM switch and receiving said TDMA signal, said modulator modulating said TDMA signal to generate a modulated TDMA signal;

a transmit antenna comprising beam-shaping and power-controlling systems coupled to said modulator and broadcasting said modulated TDMA signal using at least one downlink beam, said at least one downlink beam having a shape and number determined by said data signal, said beam-shaping and power-controlling systems enabling TDMA switching between shaped beam modes and spot beam modes of said antenna; and a satellite on-board processor comprising said data queues, said processor further comprises a power check mechanism checking that required power for said multiple snot beams is less than or equal to a total available radio frequency power in said transmit antenna.

13. The satellite system as recited in claim 12, wherein one of said plurality of services comprises a timing beacon synchronization data signal.

14. The satellite system as recited in claim 12, wherein one of said plurality of services comprises a multi-cast/broadcast data service.

15. The satellite system as recited in claim 12, wherein one of said plurality of services comprises a calibration data signal.

* * * * *